(12) United States Patent
Koppal et al.

(10) Patent No.: US 9,432,490 B2
(45) Date of Patent: Aug. 30, 2016

(54) PORTABLE SLIDING ELECTRONIC DEVICE OPERABLE TO DISABLE A TOUCHSCREEN DISPLAY WHEN OPENING AND CLOSING THE DEVICE

(75) Inventors: Rohit Krishna Koppal, Pompano Beach, FL (US); Aaron Robert Allen, Pembroke Pines, FL (US); Douglas Wayne Moskowitz, Weston, FL (US); Laura Ann Mahan, Kanata (CA); Michael George Langlois, Almonte (CA); Donald James Lindsay, Mountain View, CA (US); Sean David Drew Wilson, Waterloo (CA); Tomas Manuel Trujillo, Miami, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 777 days.

(21) Appl. No.: 13/642,641

(22) PCT Filed: Apr. 19, 2011

(86) PCT No.: PCT/US2011/032984
§ 371 (c)(1),
(2), (4) Date: Dec. 13, 2012

(87) PCT Pub. No.: WO2011/133506
PCT Pub. Date: Oct. 27, 2011

(65) Prior Publication Data
US 2013/0084921 A1 Apr. 4, 2013

Related U.S. Application Data

(60) Provisional application No. 61/327,641, filed on Apr. 23, 2010, provisional application No. 61/351,777, filed on Jun. 4, 2010.

(51) Int. Cl.
*H04B 1/38* (2015.01)
*H04M 1/02* (2006.01)

(52) U.S. Cl.
CPC ......... *H04M 1/0245* (2013.01); *H04M 1/0237* (2013.01); *H04M 2250/12* (2013.01); *H04M 2250/22* (2013.01)

(58) Field of Classification Search
CPC .................... H04M 1/72519; H04M 1/72584; H04M 1/72522; H04M 1/72547; H04M 1/0214; H04M 2250/12; H04M 1/0245; H04M 1/0237; H04M 1/02; H04M 2250/22; H04M 1/03; H04M 1/21; H01H 27/00; G06F 1/16; H01R 13/44
USPC ................................. 455/566; 348/376, 341
See application file for complete search history.

(56) References Cited

U.S. PATENT DOCUMENTS 6,748,249 B1 * 6/2004 Eromaki ............. H04M 1/0247
455/566
8,958,856 B2 * 2/2015 Ali et al. ................... 455/575.1
(Continued)

FOREIGN PATENT DOCUMENTS

EP 1763206 A2 3/2007
EP 1879364 A1 1/2008
(Continued)

*Primary Examiner* — Mahendra Patel
(74) *Attorney, Agent, or Firm* — Fish & Richardson P.C.

(57) ABSTRACT

A portable electronic device (200), including a first housing (204), a second housing (202) slidably coupled to the first housing, the first housing and the second housing movable between a closed position, an open position and a transition position between the open position and the closed position, at least one input device (212), and at least one position sensor (230, 232) operable to detect whether the portable electronic device is in the open position, the closed position or the transition position. When the at least one position sensor detects the transition position, the at least one input device is disabled.

15 Claims, 12 Drawing Sheets

FIG. 7

(56) References Cited

U.S. PATENT DOCUMENTS

| | | | |
|---|---|---|---|
| 2003/0064688 A1* | 4/2003 | Mizuta et al. .................. 455/90 |
| 2004/0198437 A1* | 10/2004 | Yamamoto .......... H04M 1/0237 |
| | | | 455/556.1 |
| 2004/0198477 A1* | 10/2004 | Jung .................. H04M 1/0245 |
| | | | 455/575.4 |
| 2005/0092079 A1* | 5/2005 | Ales ........................ F16K 7/14 |
| | | | 73/270 |
| 2005/0208799 A1* | 9/2005 | Oda ............................. 439/135 |
| 2006/0116183 A1 | 6/2006 | Infanti |
| 2006/0252464 A1* | 11/2006 | Vander Veen et al. ....... 455/567 |
| 2008/0029369 A1* | 2/2008 | Weigold ................. H03K 17/97 |
| | | | 200/17 R |
| 2008/0246634 A1 | 10/2008 | Alberth et al. |
| 2009/0073650 A1* | 3/2009 | Huang et al. ............ 361/679.56 |
| 2009/0265038 A1* | 10/2009 | Ramsey .............. F16C 32/0442 |
| | | | 700/279 |

FOREIGN PATENT DOCUMENTS

| | | |
|---|---|---|
| EP | 2031837 A2 | 3/2009 |
| JP | 2007243961 A | 9/2007 |
| WO | 2008067353 A1 | 6/2008 |

* cited by examiner

PORTABLE SLIDING ELECTRONIC DEVICE OPERABLE TO DISABLE A TOUCHSCREEN DISPLAY WHEN OPENING AND CLOSING THE DEVICE

FIELD OF TECHNOLOGY

The present disclosure relates to portable electronic devices, and in particular to portable electronic devices having a slidable upper housing and lower housing movable between an open position and a closed position.

INTRODUCTION

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as cellular phones, smart phones, Personal Digital Assistants (PDAs), tablets and laptop computers.

Devices such as PDAs or smart phones are generally intended for handheld use and ease of portability, and smaller devices are generally desirable for portability.

In some cases, such devices may be touch sensitive devices. For example, touch-sensitive devices constructed of a display (e.g. a liquid crystal display (LCD)) with a touch-sensitive overlay may be useful on such handheld devices where limited space is available for user input and output devices. Further, in some cases the screen content on the touch-sensitive devices can be modified depending on the functions and operations being performed.

In other examples, some personal electronic devices may not have touch sensitive displays.

BRIEF DESCRIPTION OF THE DRAWINGS

Embodiments of the present disclosure will now be described, by way of example only, with reference to the attached figures, wherein.

DETAILED DESCRIPTION

Figure 1:
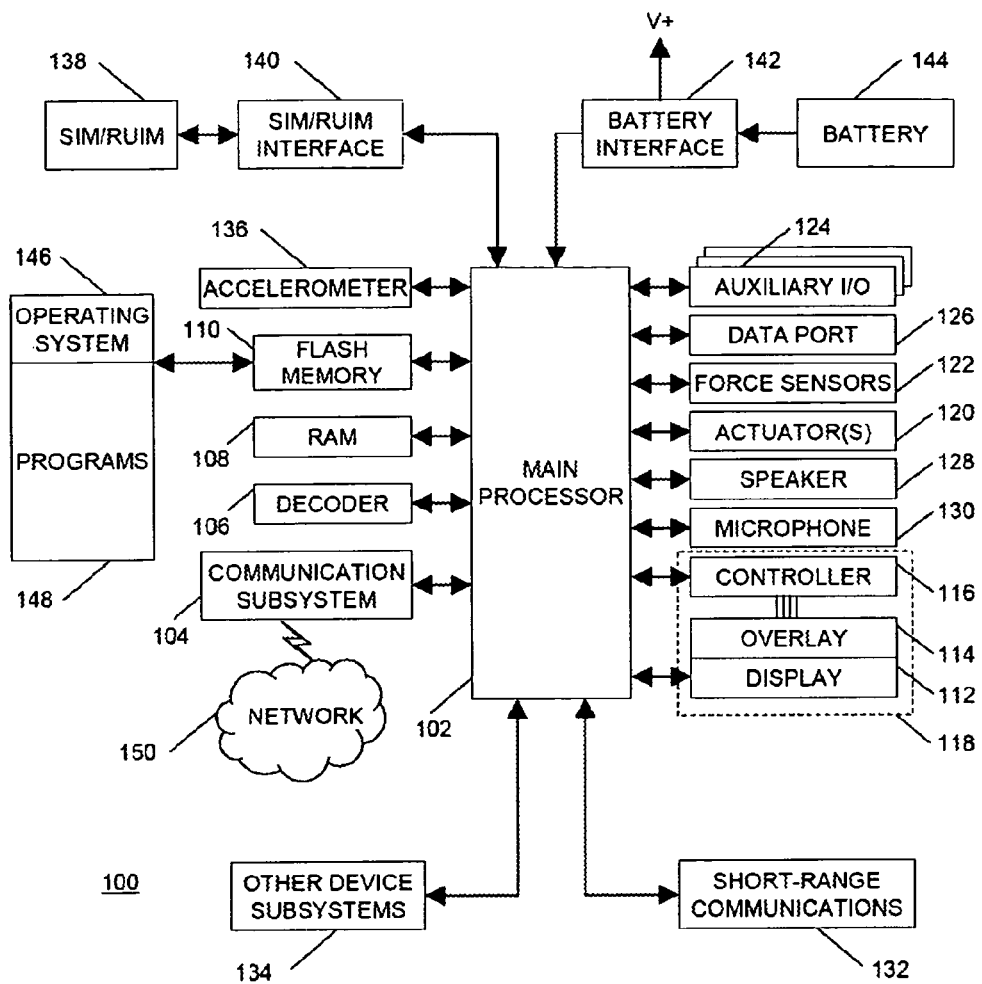
FIG. 1 is a simplified block diagram of components of a portable electronic device according to one embodiment.

According to one aspect, there is provided a portable electronic device, having a first housing, a second housing slidably coupled to the first housing, the first housing and the second housing movable between a closed position, an open position and a transition position between the open position and the closed position, at least one touchscreen input device operable to recognize touch down events when an actuator is in contact with the touchscreen display and recognize lift up events when the actuator is subsequently removed after touch down events, and at least one position sensor operable to detect whether the portable electronic device is in the open position, the closed position, or the transition position. The portable electronic device is operable to register an input command when one of the touch down events is followed by a successive lift up event. The portable electronic device is further operable to disregard the input command when the at least one position sensor detects that the electronic device is in the transition position between successive touch down and lift up events to disable the touchscreen input device.

According to another aspect, there is provided a portable electronic device including a first housing, a second housing slidably coupled to the first housing, the first housing and the second housing movable between a closed position, an open position and a transition position between the open position and the closed position, at least one input device, and at least one position sensor operable to detect whether the portable electronic device is in the open position, the closed position or the transition position. When the at least one position sensor detects that the portable electronic device is in the transition position, the at least one input device is disabled.

According to another aspect, there is provided a portable electronic device having a first housing, a second housing slidably coupled to the first housing, the first housing and the second housing movable between a closed position and an open position, a display provided on the second housing, the display operable in a portrait orientation and a landscape orientation, and at least one position sensor operable to detect whether the portable electronic device is in the open position or the closed position. The orientation of the display is determined by whether the portable electronic device is in the open position or the closed position, and in particular is locked in the portrait mode when the portable electronic device is in the open position.

The following describes an exemplary electronic device that includes a housing, a touch-sensitive display exposed by a front of the housing, and functional components comprising memory and a processor coupled to the memory and the touch-sensitive display. The touch-sensitive display may also be referred to as a touchscreen display.

It will be appreciated that for simplicity and clarity of illustration, where appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

In some instances, well-known methods, procedures and components have not been described in detail so as not to obscure the example embodiments described herein. Also, the description is not to be considered as limited to the scope of the example embodiments described herein.

FIG. 1 shows a simplified block diagram of components of a portable electronic device according to one embodiment.

The portable electronic device 100 includes multiple components such as a processor 102 that controls the operations of the portable electronic device 100. Communication functions, including data communications, voice communications, or both may be performed through a communication subsystem 104. Data received by the portable electronic device 100 may be decompressed and decrypted by a decoder 106. The communication subsystem 104 may receive messages from and send messages to a wireless network 150.

The wireless network 150 may be any type of wireless network, including, but not limited to, data-centric wireless networks, voice-centric wireless networks, and dual-mode networks that support both voice and data communications.

The portable electronic device 100 may be a battery-powered device and as shown includes a battery interface 142 for receiving one or more rechargeable batteries 144.

The processor 102 generally interacts with subsystems such as, for example, a Random Access Memory (RAM) 108, a flash memory 110, a display 112 (which may have a touch-sensitive overlay 114 connected to an electronic controller 116 that together comprise a touch-sensitive display 118 which may also be referred to as a touchscreen display), an actuator assembly 120, one or more optional force sensors 122, an auxiliary input/output (I/O) subsystem 124, a data port 126, a speaker 128, a microphone 130, short-range communications 132 and other device subsystems 134.

User-interaction with the graphical user interface may be performed through the touch-sensitive overlay 114. The processor 102 interacts with the touch-sensitive overlay 114 via the electronic controller 116.

Information, such as text, characters, symbols, images, icons, and other items may be displayed or rendered on the touch-sensitive display 118 via the processor 102.

The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 may use a Subscriber Identity Module or a Removable User Identity Module (SIM/RUIM) card 138 inserted into a SIM/RUIM interface 140 for communication with a network, such as the wireless network 150.

Alternatively, user identification information may be programmed into the flash memory 110.

The portable electronic device 100 also includes an operating system 146 and software components or programs 148 that are executed by the processor 102 and which may be stored in a persistent store such as the flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104.

For voice communications, the overall operation of the portable electronic device 100 is similar. The speaker 128 outputs audible information converted from electrical signals, and the microphone 130 converts audible information into electrical signals for processing.

Turning now to FIGS. 2 to 11, illustrated generally therein is a portable electronic device 200 according to one embodiment.

Figures 2, 3:
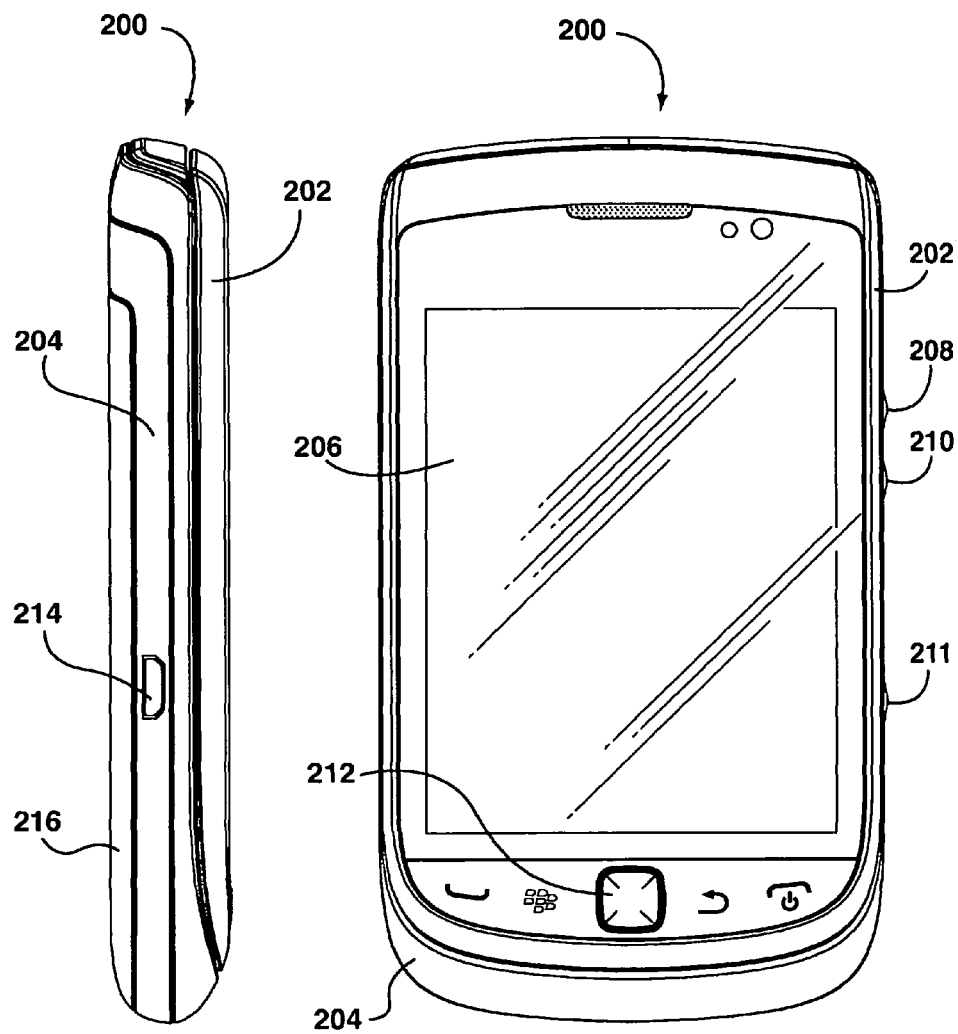
FIG. 2 is a first side view of a portable electronic device according to one embodiment shown in a closed position.
FIG. 3 is a front view of the portable electronic device of FIG. 2.
Figures 4, 5:
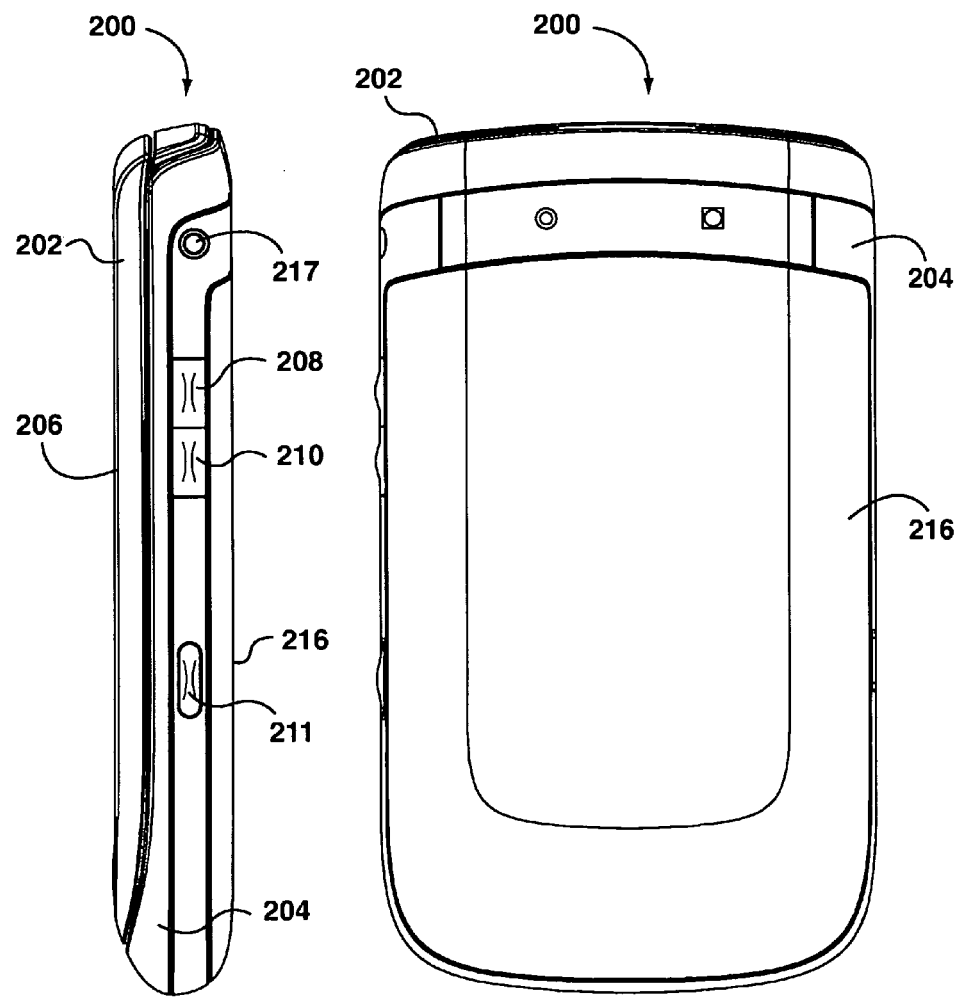
FIG. 4 is a second side view of the portable electronic device of FIG. 2.
FIG. 5 is a back view of the portable electronic device of FIG. 2.
Figures 6, 7:
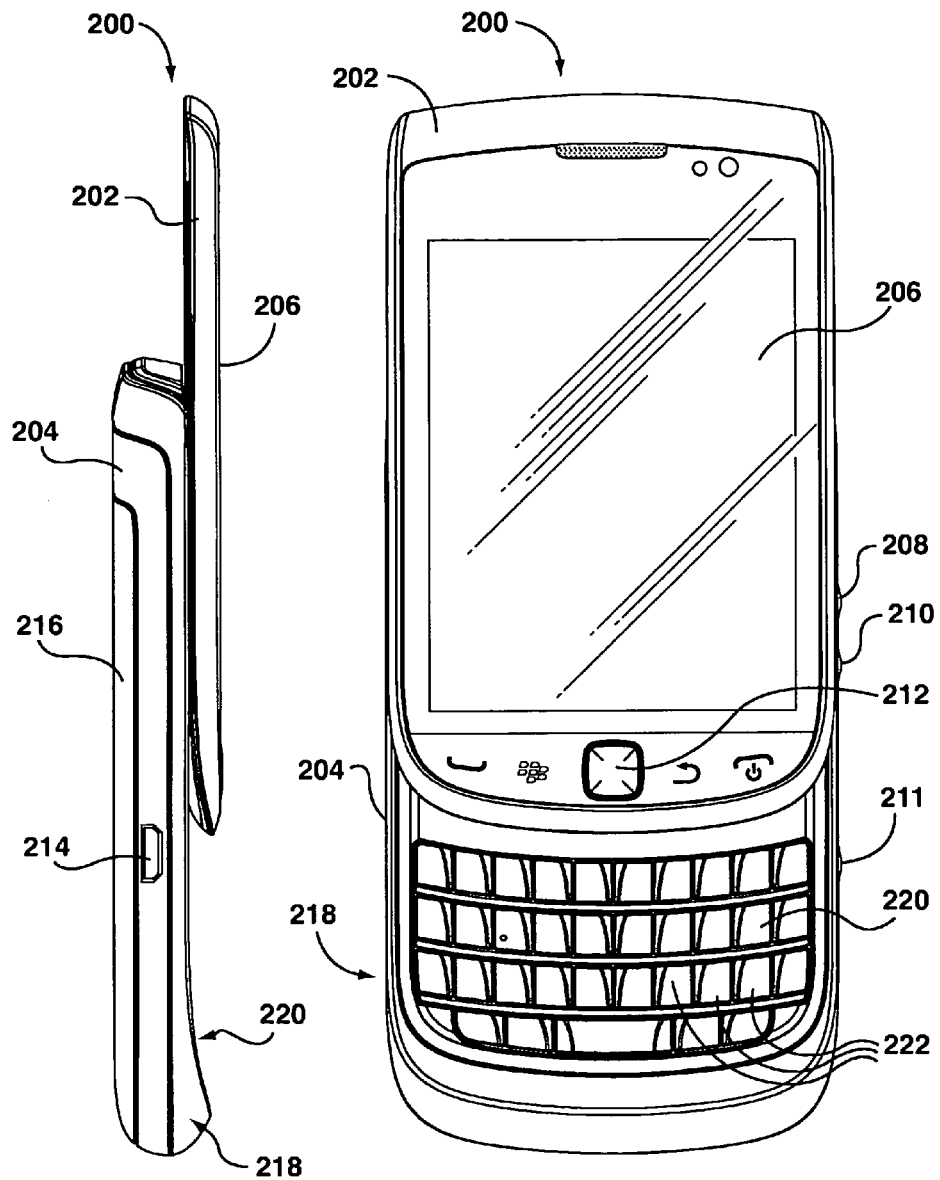
FIG. 6 is a first side view of the portable electronic device of FIG. 2 shown in an open position.
FIG. 7 is a front view of the portable electronic device of FIG. 6.
Figures 8, 9:
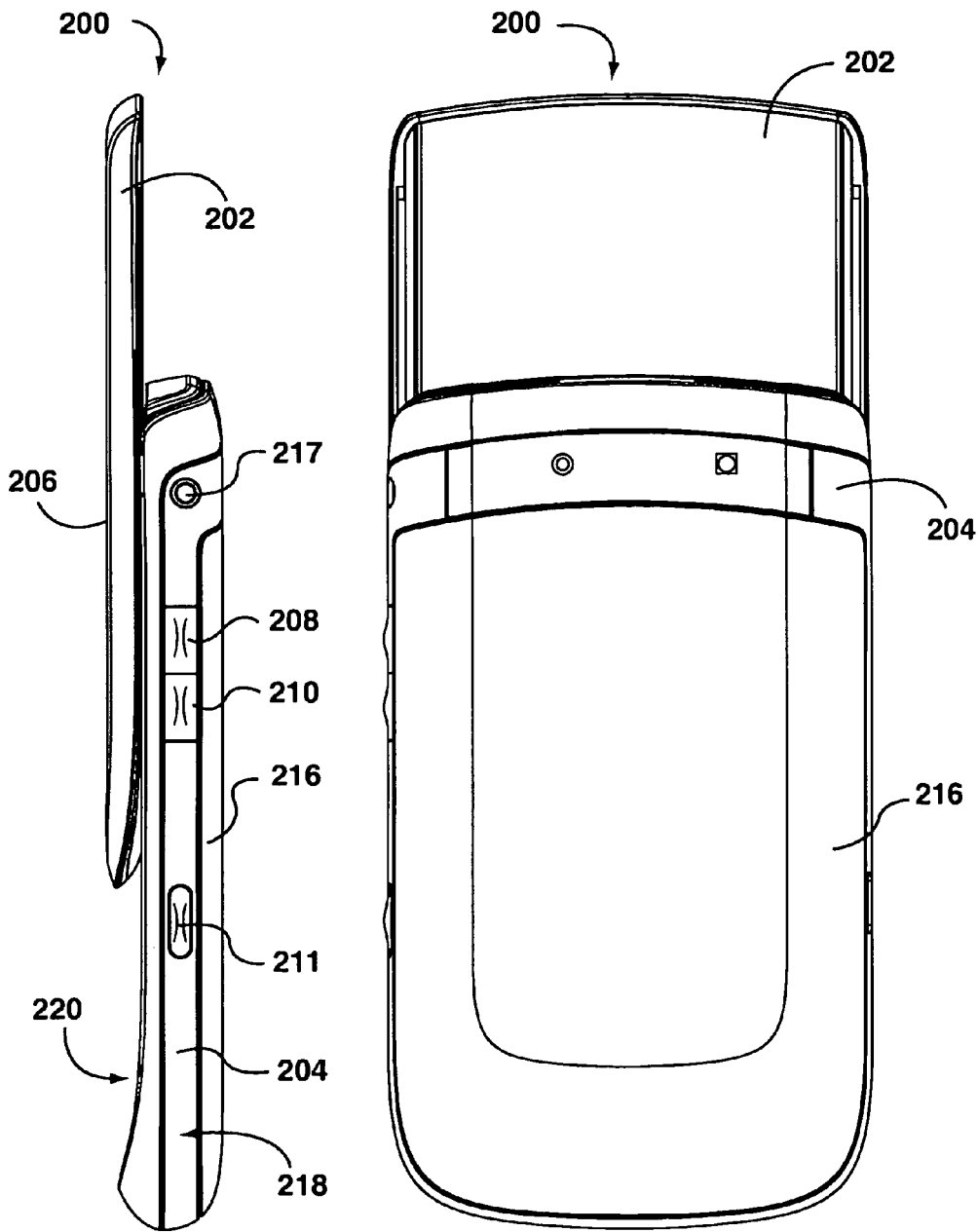
FIG. 8 is a second side view of the portable electronic device of FIG. 6.
FIG. 9 is a back view of the portable electronic device of FIG. 6.
Figure 10:
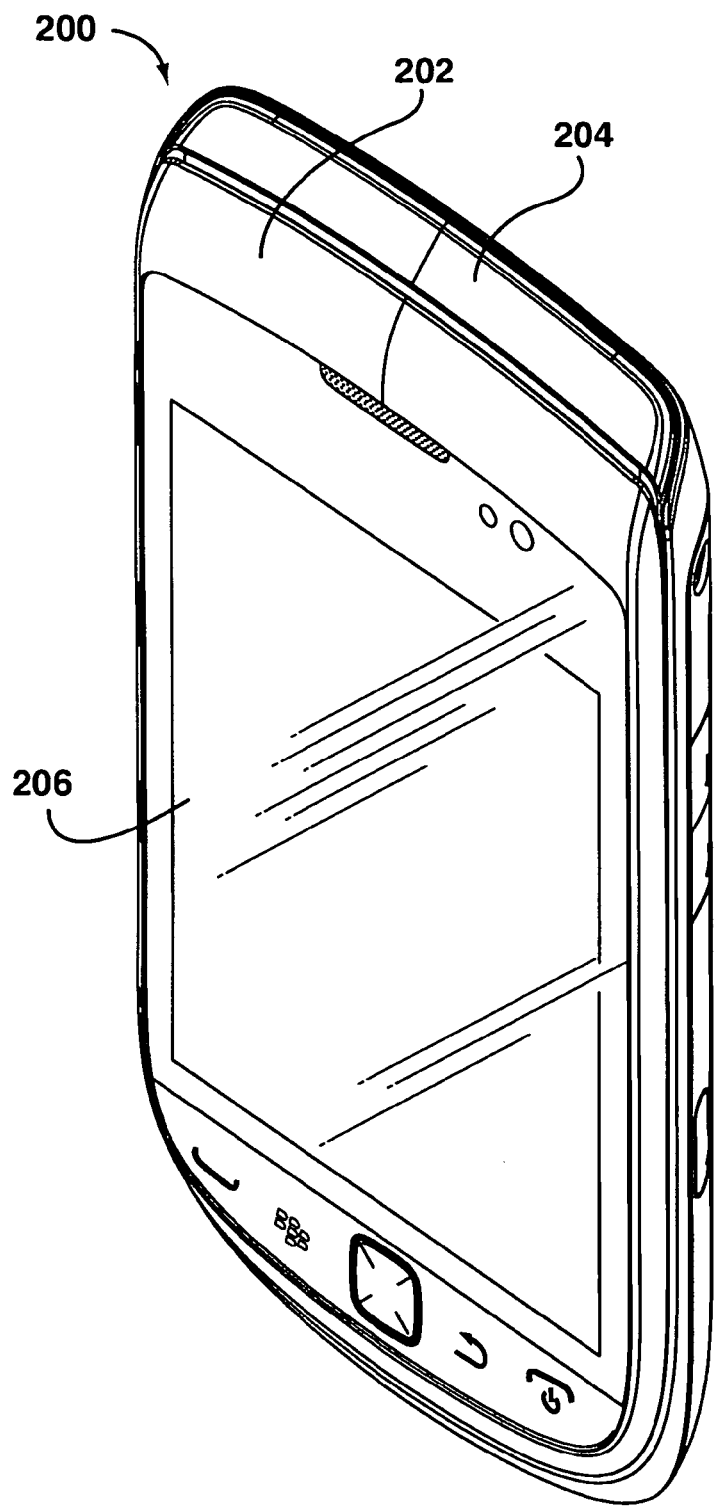
FIG. 10 is a perspective view of the portable electronic device of FIG. 2 shown in the closed position.

The portable electronic device generally includes a second or upper housing 202 (or sliding portion) and a first or lower housing 204 (or base portion). The upper housing 202 and lower housing 204 are coupled together and are slidable between a closed position (as shown in FIG. 2) and an open position (e.g. as shown in FIG. 6).

As shown, the upper housing 202 generally includes a display 206, which could be an LCD, and which may have touch screen capabilities (such as the touch screen display 118 identified in FIG. 1).

As shown, one or both of the upper housing 202 and lower housing 204 may include one or more input apparatus, such as navigation keys or buttons, a physical or virtual keyboard, a trackpad, trackball, multimedia keys, and the like.

For example, the upper housing 202 as shown includes an auxiliary input device 212. The auxiliary input device 212 may be an optical navigation module (e.g. a trackpad or optical joystick) that responds to user interaction, and which may be used for navigating around the display screen 206, to select objects on the display screen 206, or for other purposes. In some other embodiments, the auxiliary input device 212 may be a mechanical device that responds to user interaction (e.g. a trackball).

The display 206 and the auxiliary input device 212 are generally disposed on a front of the upper housing 202 and exposed for user accessibility when the portable electronic device 200 is in either of the open or closed position.

The upper housing 202 may also include other input devices, such as a dedicated phone application button, a dedicated "disconnect call" button, a home screen button, and the like. In various embodiments, these input devices may include optical sensors, mechanical buttons, or both.

Turning now to the lower housing 204, the lower housing 204 may include various buttons and other controls, such as buttons 208 and 210, and which could in some cases be used for navigation, to control volume or for other purposes.

The lower housing 204 may also include one or more application buttons 211 that can be used to automatically launch a particular application on the portable electronic device (e.g. a camera application, a phone application, etc.). In some embodiments, the button 211 may be configurable by a user (e.g. the user may be able to select the particular application launched by actuation of the button 211).

As shown in FIGS. 2 and 6, the lower housing 204 could also include one or more input or output ports, (e.g. I/O ports), such as a microUSB port 214. In some examples, the port 214 may be used for data communication with the portable electronic device 200, for charging of a battery (not shown), or for both.

As shown, the lower housing 204 may also include a battery cover 216 for covering the battery. In some embodiments, the battery cover 216 is removable. In other embodiments, the battery cover 216 may be permanently fixed to the device 200.

In some embodiments, the lower housing 204 may also include an audio jack 217. The audio jack 217 may be used to couple the portable electronic device 200 to headphones, a speaker, a microphone, and the like, for example for use in voice communication.

Turning now to FIGS. 6 to 9 and 11, as shown when the portable electronic device 200 is in the open position, a keypad 220 is exposed on a lower portion 218 of the lower housing 204. The keypad 220 generally includes a plurality of alphanumeric keys 222, which may be positioned in a plurality of rows and columns. In some embodiments, the keys 222 may represent the alphabet and may be arranged in a standard keyboard layout (e.g. QWERTY, QWERTZ, DVORAK, etc.)

As shown in FIGS. 2 to 5, when the portable electronic device 200 is in the closed position, the keypad 220 is covered by the upper housing 202. This may be beneficial as it may protect the keypad 220 when not in use, and may also inhibit undesired keys 222 from being pressed when the user is carrying the portable electronic device 200 (e.g. in a user's pocket). However, in some cases (e.g. when the display 206 is a touchscreen) the user may be able to perform functions on the portable electronic device 200 even when the portable electronic device 200 is closed by interacting with the display screen 206 (e.g. using buttons 208, 210, 211, the auxiliary input device 212, the display screen 206 itself, and the like).

When the portable electronic device 200 is in the open position (as shown in FIGS. 6 to 9 and 11), the keypad 220 is exposed for user accessibility.

In some embodiments, the display 206 may be a touch-sensitive display. In some embodiments, the touch-sensitive display may be a capacitive touch-sensitive display, and a user's touch on the touch-sensitive display may be identified by determining an X and Y location of the touch, with the X location determined by a signal generated as a result of capacitive coupling with a touch sensor layer and the Y location determined by the signal generated as a result of capacitive coupling with another touch sensor layer. Each of the touch-sensor layers provides a signal to a controller that represents the respective X and Y touch location values. A virtual button or other feature displayed on the touch-sensitive display may be selected by a mapping of the touch location to a feature on the touch-sensitive display.

The touch-sensitive display 206 may also be referred to as a touchscreen display.

In some embodiments, the portable electronic device 200 is generally taller than it is wide. In such embodiments, as the portable electronic device 200 moves between the open position and the closed position, the upper housing 202 and lower housing 204 move along a longitudinal axis of the portable electronic device 200.

Figure 14:
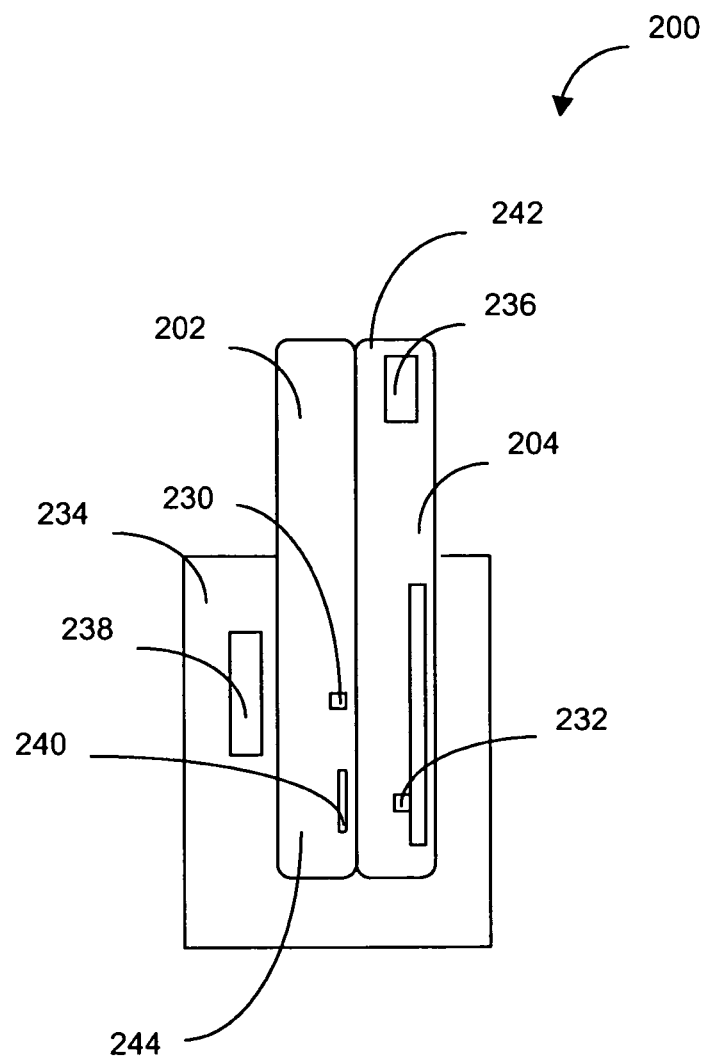
FIG. 14 is a side view of the portable electronic device of FIG. 12 shown in the closed position and in a holster.

In some embodiments, the portable electronic device 200 is provided with a holster 234 (see FIG. 14). In some cases, the portable electronic device 200 may be placed in the holster 234 when the portable electronic device 200 is not in use, or when the portable electronic device 200 is being used with a headset. The holster 234 may, for example, help to prevent accidental key-presses.

The portable electronic device 200 may include at least one sensor to detect the position of the portable electronic device 200 (e.g. whether the device 200 is in the open position or the closed position). This may allow for enabling or disabling of certain features or taking other actions based on the position of the portable electronic device 200.

For example, power may be supplied to all the input devices (i.e. display screen 206, auxiliary input device 212, buttons 208 and 210, application button 211 and the keypad 220) when the portable electronic device 200 is in the open position, and power may be cut-off to some of the input devices (i.e. the keypad 220, the display screen 206) when the portable electronic device 200 is in the closed position.

In some embodiments, it may be beneficial to know when the portable electronic device 200 is in the holster 234. This may allow for configurable notification settings. For example, the portable electronic device 200 may use a vibration alert for an incoming call when the portable electronic device 200 is in the holster 234, and a ring alert for an incoming call when the portable electronic device 200 is out of the holster 234.

Other notification settings may also be dependent on whether the portable electronic device 200 is in the holster 234. Furthermore, various components (e.g. the display 206) may be disabled when the portable electronic device 200 is in the holster 234. In some cases this may reduce power consumption.

In some embodiments, the portable electronic device 200 includes two position sensors for detecting which of at least some of the following four positions the portable electronic device 200 is currently in: (1) an open position; (2) a closed position; (3) a holster position (i.e. the portable electronic device 200 is in the holster 234); and (4) a transition position (i.e. between the open position and closed position, such as when the device 200 is being opened or closed).

Figure 12:
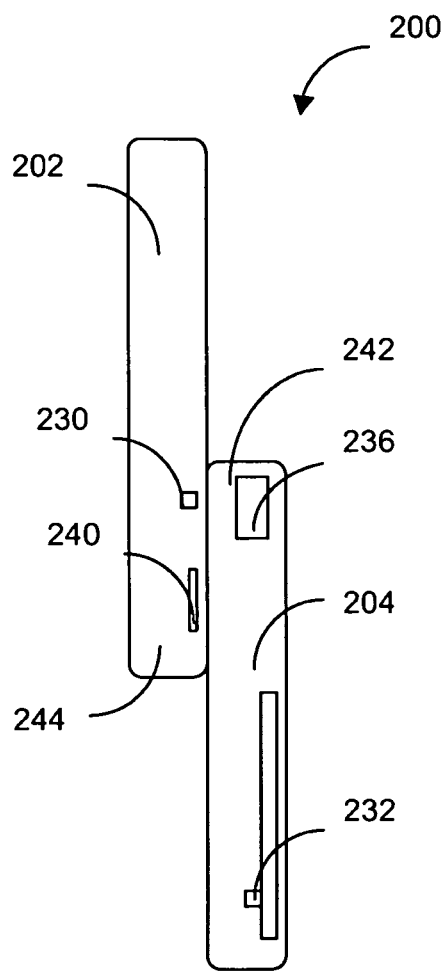
FIG. 12 is a side view of the portable electronic device of FIG. 2 shown in the open position wherein the portable electronic device has a first position sensor and a second position sensor.
Figure 13:
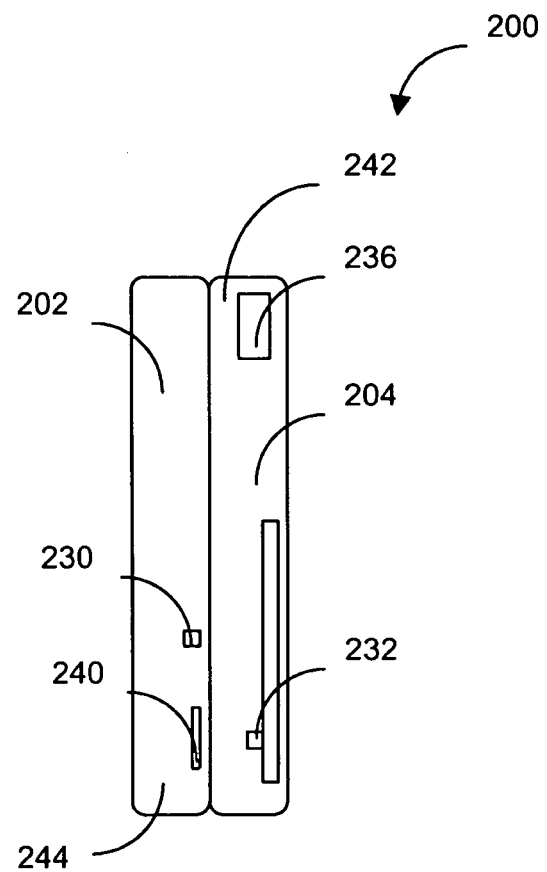
FIG. 13 is a side view of the portable electronic device of FIG. 12 shown in the closed position.

Reference is now made to FIGS. 12 to 14, which illustrate side views of the portable electronic device 200 having a first position sensor 230 and a second position sensor 232. Specifically, FIG. 12 is a side view of the portable electronic device 200 in the open position, FIG. 13 is a side view of the portable electronic device 200 in the closed position, and FIG. 14 is a side view of the portable electronic device 200 in the closed position and in the holster 234.

The two position sensors 230 and 232 are typically situated on opposite housing modules (e.g. one position sensor is situated on the upper housing 202, and one position sensor is situated on the lower housing 204). For example, in the embodiment shown in FIGS. 12 to 14, the first position sensor 230 is situated on the upper housing 202 and the second sensor 232 is situated on the lower housing 204.

The first position sensor 230 and the second position sensor 232 cooperate to detect whether the portable electronic device 200 is in the open position and the closed position. The first position sensor 230 and the second position sensor 232 may also cooperate to detect whether the portable electronic device 200 is in the transition position (i.e. between the open position and the closed position). The first position sensor 230 and the second position sensor 232 may also cooperate to detect whether the portable electronic device 200 is in the holster position (i.e. the portable electronic device 200 is in the holster 234).

In some embodiments, each position sensor 230 and 232 may detect the presence of one or more corresponding objects or fields (i.e. magnetic field) and output a sensor output signal indicating the presence or absence of the corresponding objects or fields.

In some embodiments, the position sensors 230 and 232 may be positioned sufficiently far apart on the upper and lower housings 202 and 204 respectively so that regardless of the position (open/closed/holster/transition) of the portable electronic device 200, both sensors 230 and 232 are normally not triggered by the same object or field simultaneously.

Specifically, the position sensors 230 and 232 may be positioned sufficiently far apart so that the objects or fields used to trigger the first position sensor 230 will not simultaneously trigger the second position sensor 232, and the objects or fields used to trigger the second position sensor 232 will not simultaneously trigger the first position sensor 230. This can be advantageous in avoiding errors or misreads by the sensors 230, 232.

In some embodiments, the sensor output signal produced by each of the position sensors 230 and 232 is a binary signal (i.e. High/Low, On/Off, I/O, etc.) that indicates either (i) the presence of a corresponding object or field; or (ii) the absence of a corresponding object or field. In these embodiments, the positions sensors 230 and 232 can be thought of as either "ON" (presence of a corresponding object or field), or "OFF" (absence of a corresponding object or field).

In some embodiments the position sensors 230 and 232 are magnetic sensors, such as Hall Effect Sensors, that detect the presence of a magnetic field. A Hall Effect Sensor is a transducer that varies its output voltage in response to changes in magnetic field.

In the embodiment shown in FIGS. 12 to 14, the first position sensor 230 is configured to detect the presence or absence of the magnetic fields produced by a first magnet 236 and a second magnet 238 (FIG. 14); and the second position sensor 232 is configured to detect the presence or absence of the magnetic field produced by a third magnet 240.

In some embodiments, the first, second and third magnets 236, 238 and 240 are small (i.e. less than 5 mm tall).

In some embodiments, the first magnet 236 is positioned in an upper portion 242 of the lower housing 204 so that when the portable electronic device 200 is in the open position the first magnet 236 aligns with the first position sensor 230 (see FIG. 12). Accordingly, when the portable electronic device 200 is in the open position, the first position sensor 230 will detect the magnetic field produced by the first magnet 236 and output a sensor output signal indicative of the detection. As a result, when the portable electronic device 200 is in the open position, the first position sensor 230 is "ON".

In some embodiments, the first magnet 236 is the magnet inherent in the speaker of the portable electronic device 200 (i.e. speaker 128). Accordingly, in this embodiment, a separate magnet may not be required to detect whether the portable electronic device 200 is in the open position. This may reduce the cost of the portable electronic device 200. This may also reduce the size of the portable electronic device 200.

The third magnet 240 is positioned in a lower portion 244 of the upper housing 202 so that when the portable electronic device 200 is in the closed position, the third magnet 240 aligns with the second position sensor 232 (see FIG. 13). Accordingly, when the portable electronic device 200 is in the closed position, the second position sensor 232 will detect the magnetic field produced by the third magnet 240 and output a sensor signal indicative of the detection.

The first magnet 236 may be positioned on the upper portion 242 of the lower housing 204 so that when the portable electronic device 200 is in the closed position there is sufficient distance between the first magnet 236 and the first position sensor 230 so that the first position sensor 230 will not detect the magnetic field produced by the first magnet 236. Accordingly, when the portable electronic device 200 is in the closed position, the first position sensor 230 will be "OFF" and the second position sensor 232 will be "ON".

The second magnet 238 may be positioned on the holster 234 so that when the portable electronic device 200 is in the holster position (i.e. the portable electronic device 200 is placed in the holster 234) the second magnet 238 aligns with the first position sensor 230 (see FIG. 14). Accordingly, when the portable electronic device 200 is in the holster position, the first position sensor 230 will detect the magnetic field produced by the second magnet 238 and output a sensor signal indicative of the detection.

Since the portable electronic device 200 can typically only be put in the holster 234 in the closed position, when the portable electronic device 200 is in the holster position, typically both the first position sensor 230 and the second position sensor 232 will be "ON".

In some embodiments, the first position sensor 230 produces a single sensor output signal that indicates the presence or absence of a magnetic field irrespective of which magnet (i.e. the first magnet 236 or the second magnet 238) produced the magnetic field. In other embodiments, the first position sensor 230 may produce multiple sensor output signals, each signal indicating the presence or absence of a specific magnetic field.

For example, the first position sensor 230 may produce a first sensor output signal that indicates the presence or absence of the magnetic field produced by the first magnet 236, and a second sensor output signal that indicates the presence or absence of the magnetic field produced by the second magnet 238.

In one embodiment, the first position sensor 230 is a polarity-dependent magnetic sensor that produces two sensor output signals. The first sensor output signal indicates the presence or absence of an N-pole magnetic field, and the second sensor output signal indicates the presence or absence of an S-pole magnetic field. In this embodiment, the first position sensor 230 is capable of distinguishing an N-pole magnetic field produced by one magnet (i.e. the first magnet 236) from an S-pole magnetic field produced by another magnet (i.e. the second magnet 238). Accordingly, if one of the first and second magnets 236 and 238 produces an N-pole magnetic field and the other produces an S-pole magnetic field, the first position sensor 230 can distinguish between the magnetic field produced by the first magnet 236 and the magnetic field produced by the second magnet 238.

In another embodiment, the first position sensor 230 may include a plurality of dies with different magnetic field strength triggering points in a single package. For example, if the first magnet 236 produces a magnetic field of strength A, and the second magnet 238 produces a magnetic field of strength B, the first position sensor 230 may be provided with two dies. The first die may trigger above magnetic field strength A, and the second die may trigger above magnetic field strength B. It may then be possible to determine which of the two magnets (the first magnet 236 or the second magnet 238) triggered the first position sensor 230 based on which of the two dies was triggered.

Although the position sensors 230 and 232 have been described above as being magnetic sensors, it will be evident to a person of skill in the art that other types of sensors may be used. For example, in other embodiments, the positions sensors 230 and 232 may be proximity sensors or mechanical switches.

In some embodiments, the portable electronic device 200 may also include a state determiner (not shown) that receives the sensor output signals from the position sensors 230 and 232 and determines the position of the portable electronic device 200 based on the sensor outputs signals. For example, in the embodiment shown in FIGS. 12 to 14, the state determiner may determine (i) the portable electronic device 200 is in the open position when the first position sensor 230 is "ON" and the second position sensor 232 is "OFF"; (ii) the portable electronic device 200 is in the closed position when the first position sensor 230 is "OFF", and the second position sensor 232 is "ON"; (iii) the portable electronic device 200 is in the holster position when the first position sensor 230 is "ON" and the second position sensor 232 is "ON", and (iv) the portable electronic device 200 is in the transition position when both the first and second position sensors 230, 232 are "OFF".

For example, when the portable electronic device 200 is in the closed position, the second position sensor 232 is "ON" (e.g. the second position sensor 232 detects the third magnet 240) and the first position sensor 230 is "OFF". However, as the device 200 is opened, the third magnet 240 moves away from the second position sensor 232, and at some point the second position sensor 232 will no longer sense the third magnet 240 (e.g. the second position sensor 232 switches from "ON" to "OFF"); however the first position sensor 230 will not yet have detected the magnetic field produced by the first magnet 236 (accordingly, the first position sensor 230 is still "OFF"). When this happens, the state determiner can determine that the device 200 is in the transition position between the closed position and the open position.

Similarly, when the device 200 is in the open position and moves towards the closed position, at some point the first position sensor 230 will switch to "OFF" before the second position sensor 232 switches to "ON", and accordingly the state determiner can determine that the device 200 is in the transition position.

In some embodiments, when the portable electronic device 200 is in the transition position, one or more of the input devices on the device 200 may be disabled. For example, one or more of the input devices (i.e. the touchscreen display screen 206, auxiliary input device 212, buttons 208 and 210, application button 211 and the keypad 220) may be disabled so as to inhibit undesired inputs when the device 200 is in the transition position.

In particular, the touchscreen display 206 may be disabled or "locked" so as to not receive input when the device 200 is in the transition position (e.g. when the device is being opened or closed). This may be particularly beneficial when a user is opening the device (e.g. moving from a closed position to an open position), as the opening is often performed using a thumb or other finger to push the upper housing 202 away from the lower housing 204 (while the user grips the lower housing 204), and which may tend to lead to inadvertent and undesired inputs being made on the touchscreen display 206 if the touchscreen on the display 206 is not disabled.

In some embodiments, the device 200 may be configured to register an input on the display 206 after a combination of two successive events: a "touch down" event and a "lift up" event. For example, the touchscreen display 206 may recognize a "touch down" event when a user's finger or thumb (or another actuator) is placed onto the display 206, and a "lift up" event when the user's finger or thumb (or the other actuator) is subsequently removed from the display 206 after a "touch down" event. When both "touch down" and "lift up" events occur, the device 200 may recognize an input on the display 206 at the location of the user's finger or thumb.

In some cases, the location of the input may be based on the location of the finger or thumb on the display 206 during the "lift up" event (which may be different from the location of the thumb or finger during the "touch down" event).

As discussed above, when the device 200 is in the transition position (e.g. when the device 200 is being opened or closed), it may be desirable to inhibit receiving inputs via the display 206. For example, a user's finger or a thumb may be inadvertently placed on the display 206 during the transition between the open position and the closed position for the upper housing portion 202, which could lead to unwanted inputs.

In some embodiments, input received during the transition may be ignored by disregarding "lift up" events that occur while the device is in the transition position, or after the device 200 moves through the transition position, or both.

For example, as the upper housing portion 202 is moved between the open and closed positions, an actuator such as a user's finger or thumb may touch the display 206, triggering a "touch down" event. However, as the device 200 enters the transition position, a determination can be made that a subsequent "lift up" event should be ignored. In this manner, inadvertent inputs using the display 206 can be inhibited from occurring as the device 200 is opened and closed.

In some embodiments, this technique can be extended to when the device 200 has been fully opened. For example, with the device 200 in the closed position, the user may place a thumb or finger onto the display 206 to open the device 200, triggering a "touch down" event. As the upper housing portion 202 is moved between the open and closed positions, the device 200 enters the transition position and a determination is made that a subsequent "lift up" event should be ignored. However, the user may continue to be in contact with the display 206 using the finger or thumb until the device 200 is in the open position. Once in the open position (or at a later point in the transition position), the user may then remove their finger or thumb, which would normally trigger a "lift up" event. However, since the device 200 has passed through or at least entered the transition position between the "touch down" event and the "lift up" event, the subsequent "lift up" event can be disregarded such that no input is recognized.

In such a case, in some embodiments the user may have to remove the finger or thumb from the display 206 and then execute another "touch down" event before a subsequent "lift up" event will then be recognized.

In some embodiments, the processor (i.e. processor 102) executes one or more actions based on the position of the portable electronic device 200. For example, the processor (i.e. processor 102) may provide power to the input devices (i.e. display screen 206, auxiliary input device 212, buttons 208 and 210, application button 211 and the keypad 220) when the portable electronic device 200 is in the open position, and disable or turn off power to at least some of the input devices (i.e. keypad 220) when the portable electronic device 200 is in the closed position.

In another example, all input devices (i.e. display screen 206, auxiliary input device 212, buttons 208 and 210, application button 211 and the keypad 220) may be disabled when the portable electronic device 200 is in the holster position.

In a further example, the processor (i.e. processor 102) may provide visual notification of an incoming call using the display screen 206 when the portable electronic device 200 is in the open position or the closed position, and audio notification of an incoming call when the portable electronic device 200 is in the holster position. It will be evident to a person of skill in the art that these are exemplary actions only and the processor (i.e. processor 102) may be configured to execute other actions based on the position of the portable electronic device 200.

The state determiner may be implemented in software, hardware, firmware or any appropriate combination thereof. In one embodiment, the state determiner is implemented in software that is executed on the processor (i.e. processor 102) of the portable electronic device 200. In other embodiments, the state determiner is separate and distinct from the processor (i.e. processor 102).

Figure 15:
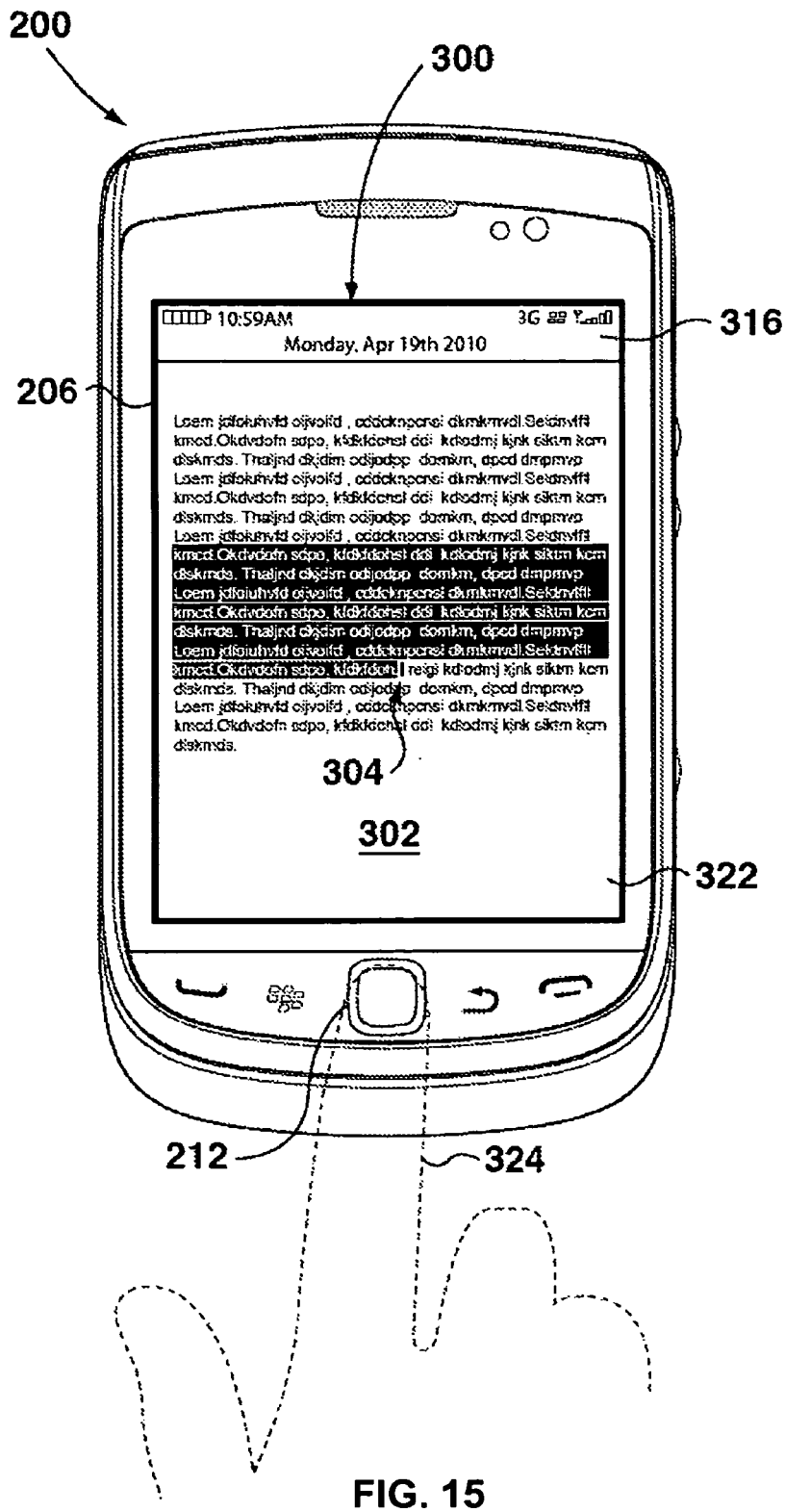
FIG. 15 is a front view of a portable electronic device shown in a portrait orientation.

In some embodiments, mechanical sensors (e.g. switches or latches) may be used as an alternative to, or in addition to, one or more of the sensors 230, 232 and magnets 236, 238, 240, In some embodiments, the display 206 of the device 200 may be operable so as to be oriented in either a portrait (vertical) configuration or a landscape (horizontal) configuration. For example, as shown in FIG. 15, the portable electronic device 200 is in a portrait orientation. Alternatively, as shown in FIG. 16, the portable electronic device 200 is in a landscape orientation.

Generally, a portrait orientation is one in which the text, images and other user interface elements extend in a direction transverse (typically perpendicular) to the length of the display 206 (for example, the text may be oriented transverse to a longitudinal axis of the device 200 as shown in FIG. 15) so that, for example, the text may be read while viewing the display 206 with the device 200 in a vertical orientation.

Figure 16:
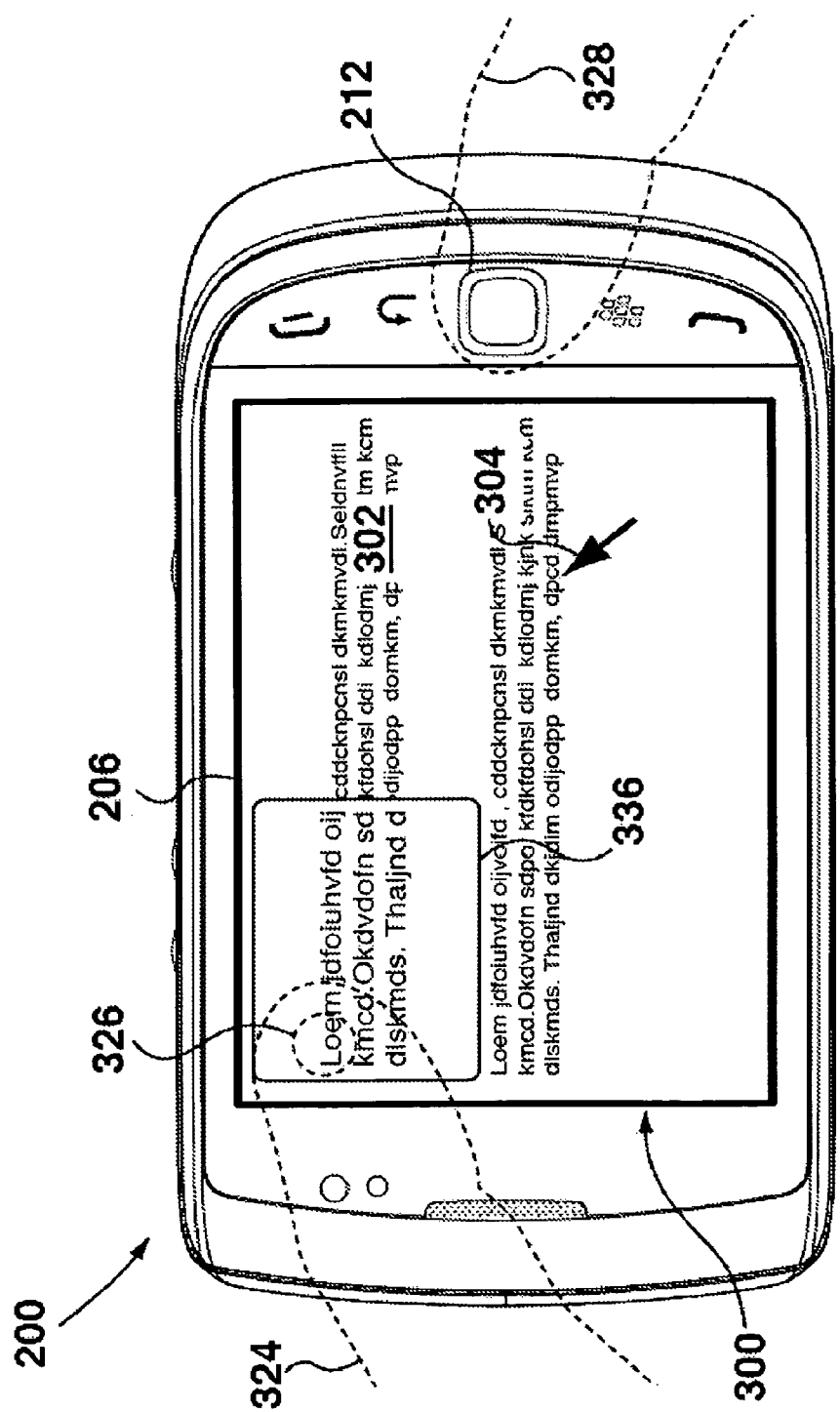
FIG. 16 is a front view of the portable electronic device shown in a landscape orientation.

Conversely, a landscape screen orientation is one in which the text, images and other user interface elements may extend in a direction transverse (typically perpendicular) to the width of the display 206 (with the text being oriented in alignment with the longitudinal axis of the device 200, as shown in FIG. 16) so that the text may be read while viewing the display 206 with the device 200 in a horizontal orientation.

In some embodiments, the GUI 300 may change its screen orientation between the portrait orientation and landscape orientation in accordance with changes in orientation of the handheld electronic communication device 200 (e.g. as the portable electronic device 200 is tilted by a user from a vertical to a horizontal orientation and vice versa). In other embodiments, the GUI 300 may not change its screen orientation based on changes in orientation of the portable electronic device 200.

As illustrated, the GUI 300 includes a display area 302 with a cursor 304 thereon. In some embodiments, the top of the display area 302 may include a status bar 316 which may display information such as the current date and time, icon-based notifications, device status and/or device state. The GUI 300 may also include a toolbar 322 for displaying one or more selectable virtual buttons (not shown). The GUI 300 may also include a magnification window 336 within the display area 302 of the GUI 300 (as shown in FIG. 16) which may be used to magnify text on the display 206.

As shown, one or more fingers 324 or thumbs 328 may be used to interact with the device 200, for example via the auxiliary input device 212 or by touch interaction (shown as 326) on the display screen 206.

The GUI 300 may have a screen orientation in which the text and other user interface elements of the GUI 300 are oriented for normal viewing. It will be appreciated that the screen orientation for normal viewing may be independent of the language supported, that is the screen orientation for normal viewing may be the same regardless of whether a row-oriented language or column-oriented language (such as Asian languages) is displayed within the GUI 300.

In some embodiments, the device 200 may be configured so as to default or be "locked" into one or both of the portrait orientation or the landscape orientation under certain conditions so that changing the orientation of the device 200 (e.g. by tilting or moving the device 200 from a vertical orientation to a horizontal orientation, and vice versa) will not change the display from a portrait orientation to a landscape orientation, and vice versa.

Figure 11:
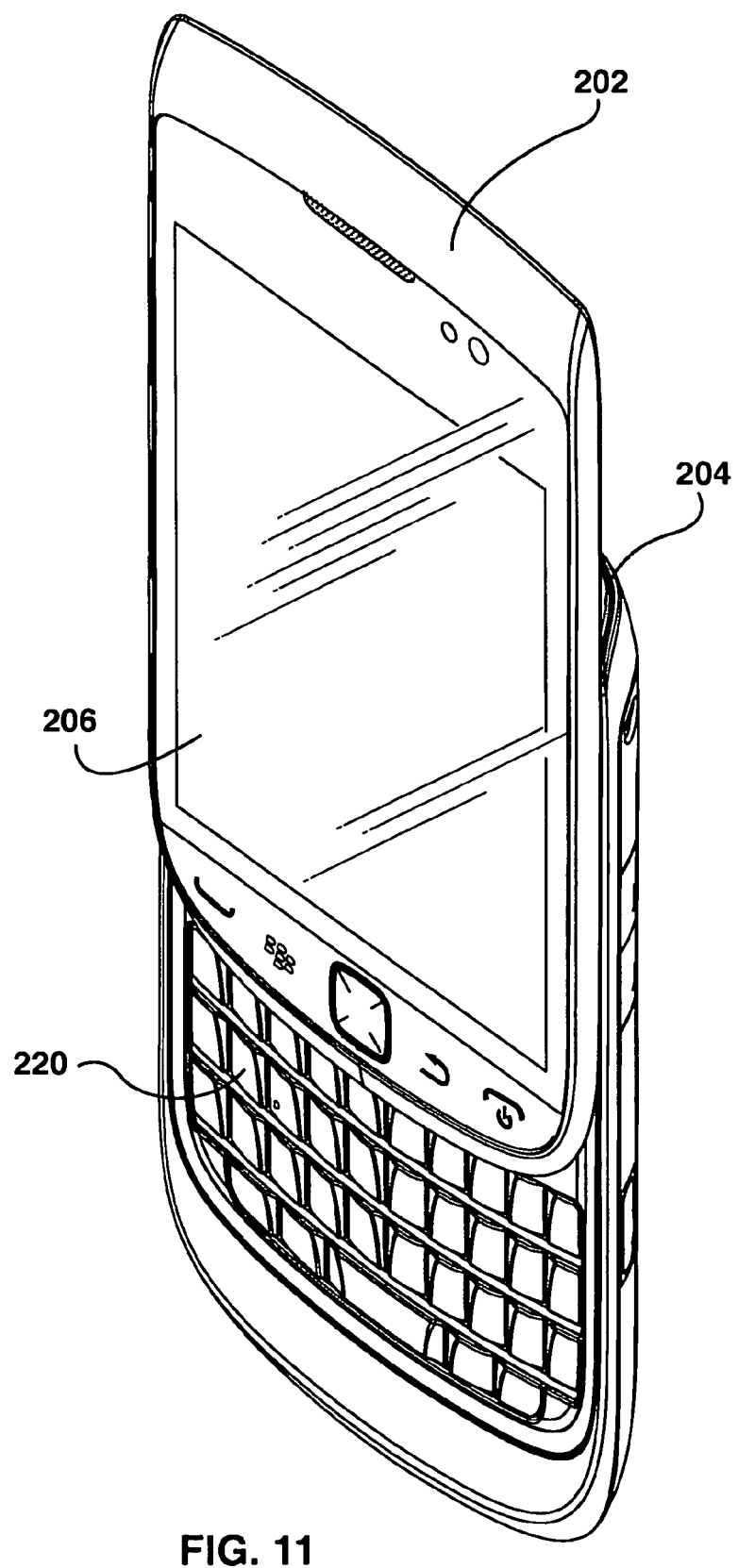
FIG. 11 is a perspective view of the portable electronic device of FIG. 6 shown in the open position.

For example, the device 200 may be configured so that the display is locked in the portrait orientation (as shown in FIG. 15) when the device 200 is in the open position (as shown in FIG. 11). This may facilitate a user entering data using the keypad 220 (e.g. by inhibiting a landscape orientation from being engaged if and when the device 200 is open and being tilted or re-oriented).

Alternatively, in some embodiments, the device 200 may be configured to be "locked" into the landscape mode (as shown in FIG. 16) when the device is in the closed position.

According to some of the embodiments as described herein, at least one input device on a portable electronic device can be disabled as the portable electronic device is moved between an open position and a closed position. For example, a touchscreen display may be disabled by disregarding a "lift up" event after a transition position has been detected and until the transition position has been completed and the device returns to either the open position or the closed position. In this manner, undesired inputs on the touchscreen display can be avoided when opening and closing the device.

While the above description provides examples of one or more processes or apparatuses, it will be appreciated that other processes or apparatuses may be within the scope of the accompanying claims.

The invention claimed is:

1. A portable electronic device, comprising:
a first housing;
a second housing slidably coupled to the first housing, the first housing and the second housing movable between a closed position, an open position and a transition position between the open position and the closed position;
at least one touchscreen display operable to recognize touch down events when an actuator is in contact with the touchscreen display and to recognize lift up events when the actuator is subsequently removed after touch down events;
a plurality of positioning objects, wherein each position object in the plurality of positioning objects comprises a different magnetic field strength; and
at least one position sensor operable to detect each of the different magnetic field strengths, and further operable to detect whether the portable electronic device is in the open position, the closed position, or the transition position based on a magnetic field strength triggering point in a plurality of magnetic field strength triggering points corresponding to one of the open position, the closed position, and the transition position being triggered by a corresponding one of the different magnetic field strengths;

wherein the portable electronic device is operable to:
register an input command when one of the touch down events is followed by a successive lift up event, and
disregard the input command when the at least one position sensor detects that the electronic device is in the transition position to disable the touchscreen display.

2. The portable electronic device of claim 1, wherein the portable electronic device is operable to disregard the input command by disregarding at least one lift up event after the transition position has been detected.

3. The portable electronic device of claim 2, where the portable electronic device disregards the at least one lift up event until the position sensor detects that the portable electronic device is in the open position or the closed position.

4. The portable electronic device of claim 1, wherein the at least one position sensor comprises:
a first position sensor operable to detect proximity of at least one positioning object in the plurality of positioning objects and output a first sensor output signal indicative of the proximity of the at least one positioning object to the first position sensor; and
a second position sensor operable to detect proximity of the at least one positioning object in the plurality of positioning objects and output a second sensor output signal indicative of the proximity of the at least one positioning object to the second position sensor;
wherein the first and second sensor output signals jointly indicate whether the portable electronic device is in one of the open position, the closed position, and the transition position.

5. The portable electronic device of claim 4, wherein the at least one positioning object comprises at least one magnet having a magnetic field and the at least one position sensor comprises a magnetic sensor operable to detect the magnetic field.

6. The portable electronic device of claim 5, wherein the at least one of the first position sensor and the second position sensor is a polarity-dependent sensor operable to output a sensor output signal indicative of the proximity of one of a S-pole magnetic field and a N-pole magnetic field, or an absence of detectable magnetic fields.

7. The portable electronic device of claim 5, wherein the at least one of the first position sensor and the second position sensor includes a first die with a first magnetic field strength triggering point and a second die with a second magnetic field strength triggering point that is different from that of the first die, and the at least one magnet comprises a first magnet with a first magnetic field strength detectable by the first die, and a second magnet with a second magnetic field detectable by the second die such that the position sensor is operable to determine which of the first magnet and the second magnet is within the proximity of the sensor.

8. The portable electronic device of claim 5, wherein the at least one positioning object comprises a magnet from an audio speaker.

9. The portable electronic device of claim 4, wherein the first position sensor is located on the first housing and the second position sensor is located on the second housing and the at least one positioning object comprises a first positioning object that is detectable by the first position sensor when the electronic device is in an open position and a second positioning object that is detectable by the second position sensor when the device is in a closed position.

10. The portable electronic device of claim 9 wherein the first positioning object, second positioning object, first position sensor and second position sensor are located at opposing ends of the first housing and the second housing such that each of a first magnetic field and a second magnetic field cannot be simultaneously detected by each of the first position sensor and the second position sensor.

11. The portable electronic device of claim 9, further comprising a state determiner for determining whether the portable electronic device is in one of the open position, the closed position, and the transition position based on the first and second sensor output signals.

12. The portable electronic device of claim 11, wherein:
each of the first sensor output signal and second sensor output signal is in one of an on state indicating that the first position sensor is in the proximity of one of the first positioning object and second positioning object and an off state indicating that the sensor is not in the proximity of one of the first positioning object and second positioning object;
the state determiner is operable to determine that the portable electronic device is in the open position when the first position sensor is in the on state and the second position sensor is in the off state;
the state determiner is operable to determine that the portable electronic device is in the closed position when the first position sensor is in the off state and the second position sensor is in the on state; and
the state determiner is operable to determine that the portable electronic device is in the transition position when the first position sensor is in the off state and the second position sensor is in the off state.

13. The portable electronic device of claim 1, further comprising a holster having a positioning object detectable by the at least one position sensor when the portable electronic device is received in the holster.

14. The portable electronic device of claim 13, wherein the electronic device is operable to activate or deactivate at least one feature of the electronic device when the at least one position sensor detects that the electronic device is received in the holster.

15. The portable electronic device of claim 1, wherein the electronic device is further operable to disable at least one component of the electronic device based on whether the electronic device is in the open position, transition position, or the closed position.

* * * * *